United States Patent [19]

Desrosiers

[11] Patent Number: 4,815,260
[45] Date of Patent: Mar. 28, 1989

[54] PLANT HARVESTER

[76] Inventor: J. Armand Desrosiers, 212 Scenic Glen Place N.W., Calgary, Alberta, Canada

[21] Appl. No.: 938,189

[22] Filed: Dec. 5, 1986

[51] Int. Cl.⁴ .......................................... A01D 44/00
[52] U.S. Cl. .............................................. 56/9; 56/8
[58] Field of Search ........................................ 56/8, 9

[56] References Cited

U.S. PATENT DOCUMENTS

| | | | |
|---|---|---|---|
| 2,941,344 | 6/1960 | Tertson | 56/7 |
| 3,017,857 | 1/1962 | Munz | 56/9 |
| 3,407,577 | 10/1968 | Fiske | 56/8 |
| 4,177,624 | 12/1979 | Kelpin | 56/9 |
| 4,328,658 | 5/1982 | Desrosiers | 56/8 |
| 4,696,149 | 9/1987 | Hawk | 56/8 |

Primary Examiner—John Weiss
Attorney, Agent, or Firm—George H. Dunsmuir

[57] ABSTRACT

A harvester for plants and weeds, particularly aquatic plants, pulls the plants by winding them onto a rotating, endless cable. Tension in the cable is controlled, and an operative portion of the cable is positionable for varying its height and angle to the horizontal. The harvester is mountable on a boat having an adjustable freeboard and multiple, individually driven, retractable paddle wheels provide maximum maneuverability during use and compactness during transport.

11 Claims, 8 Drawing Sheets

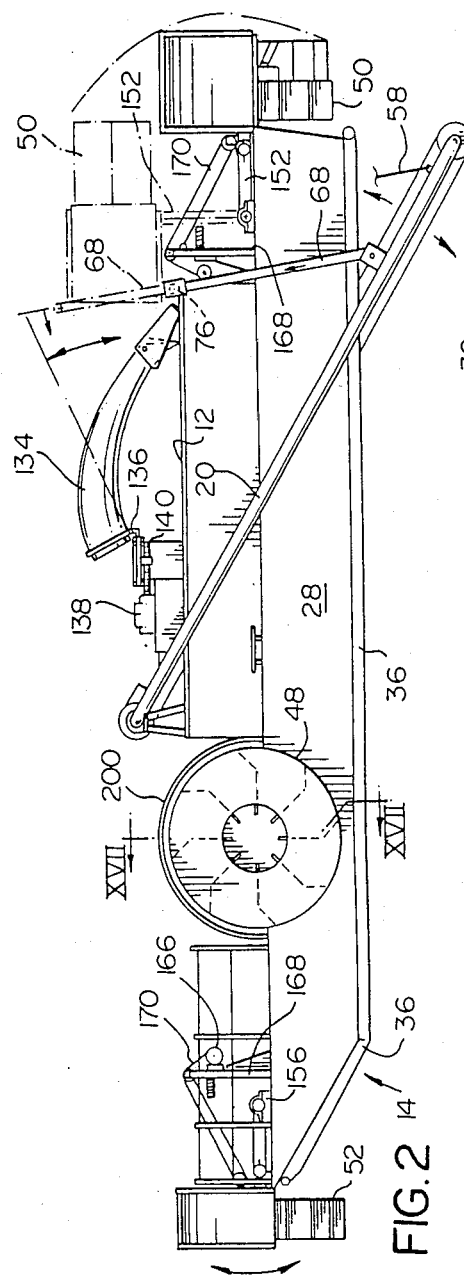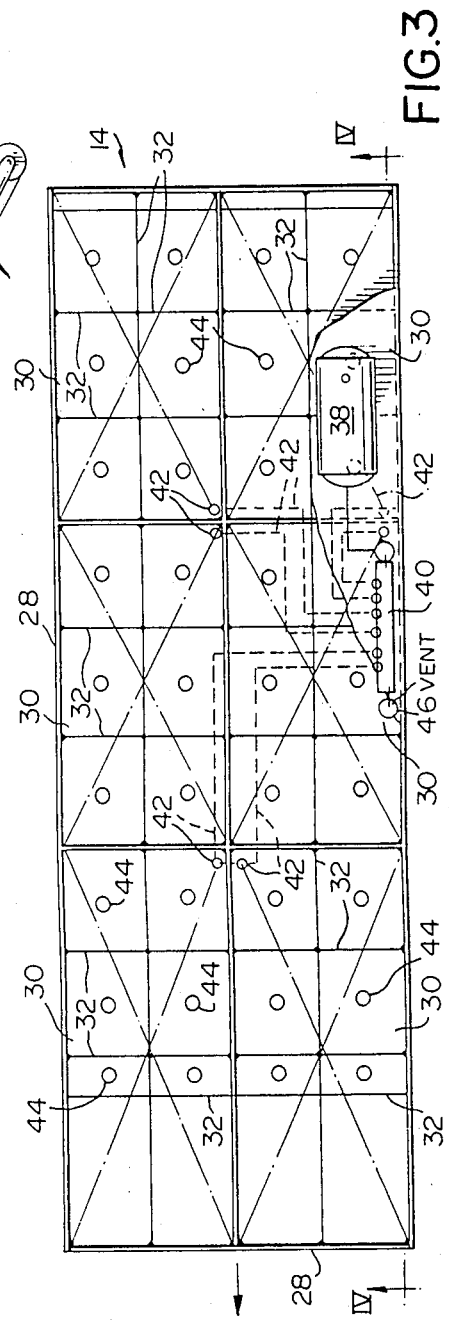

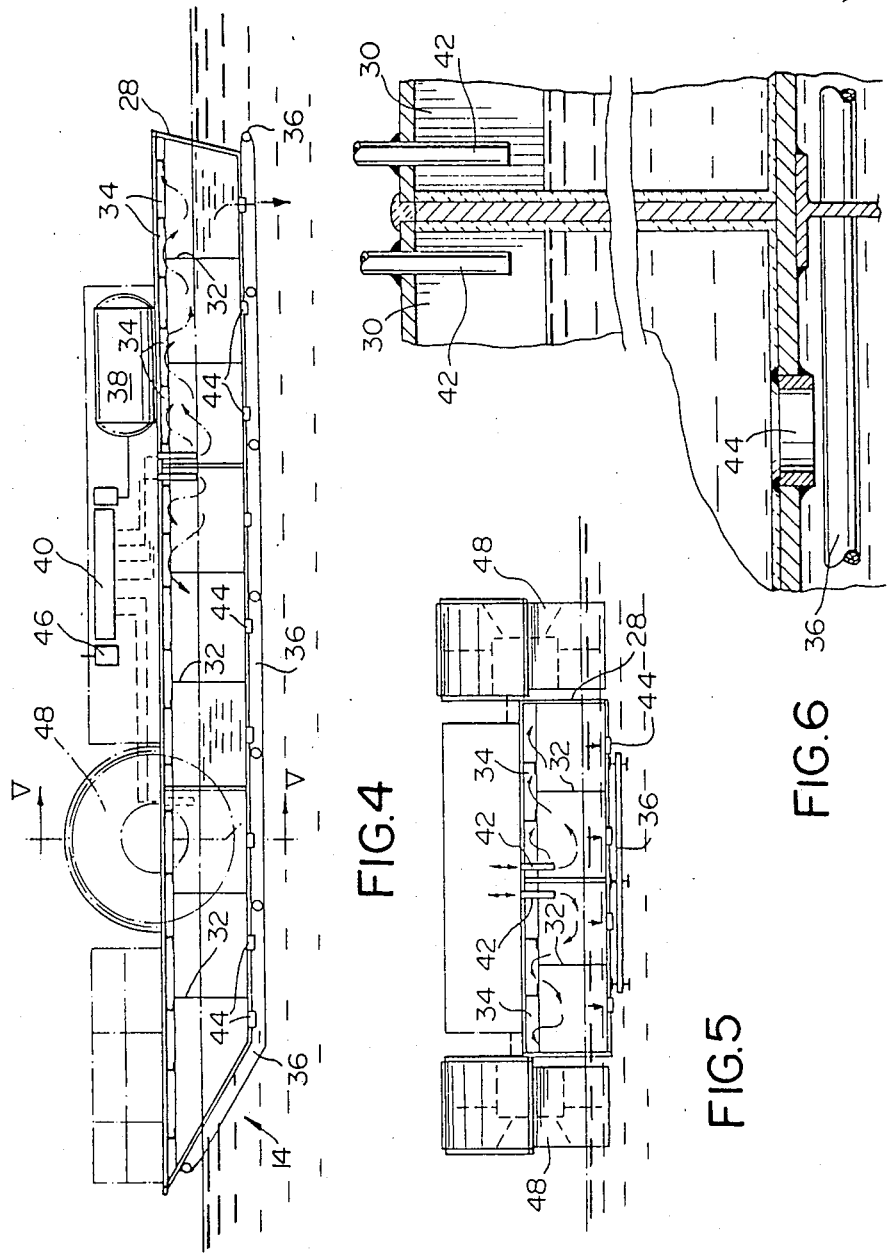

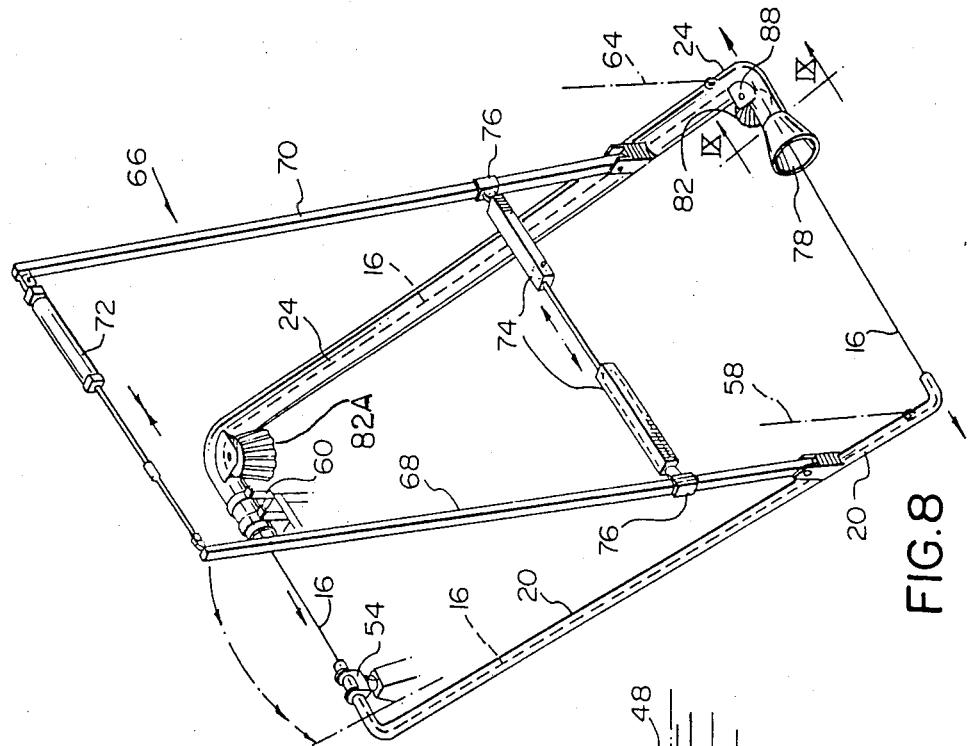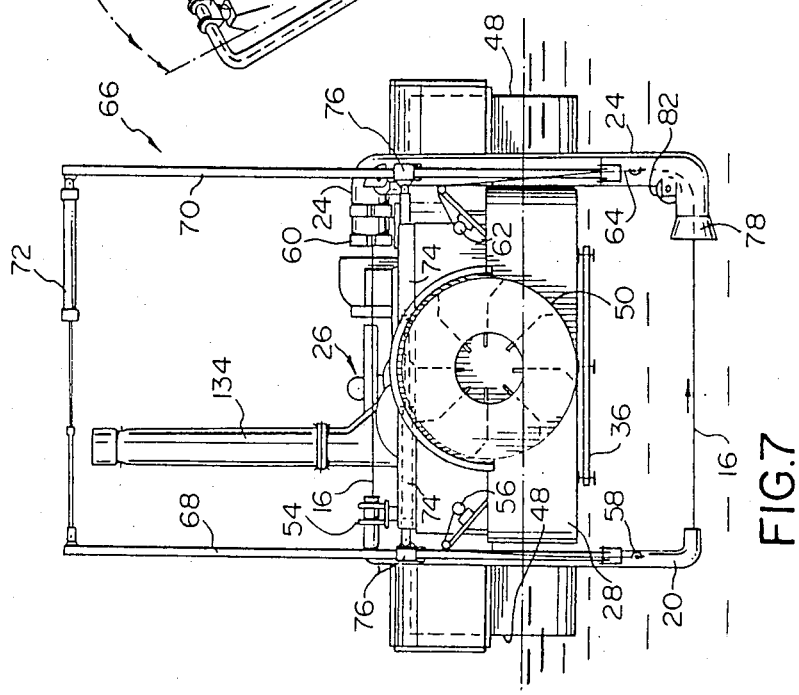
FIG. 8
FIG. 7

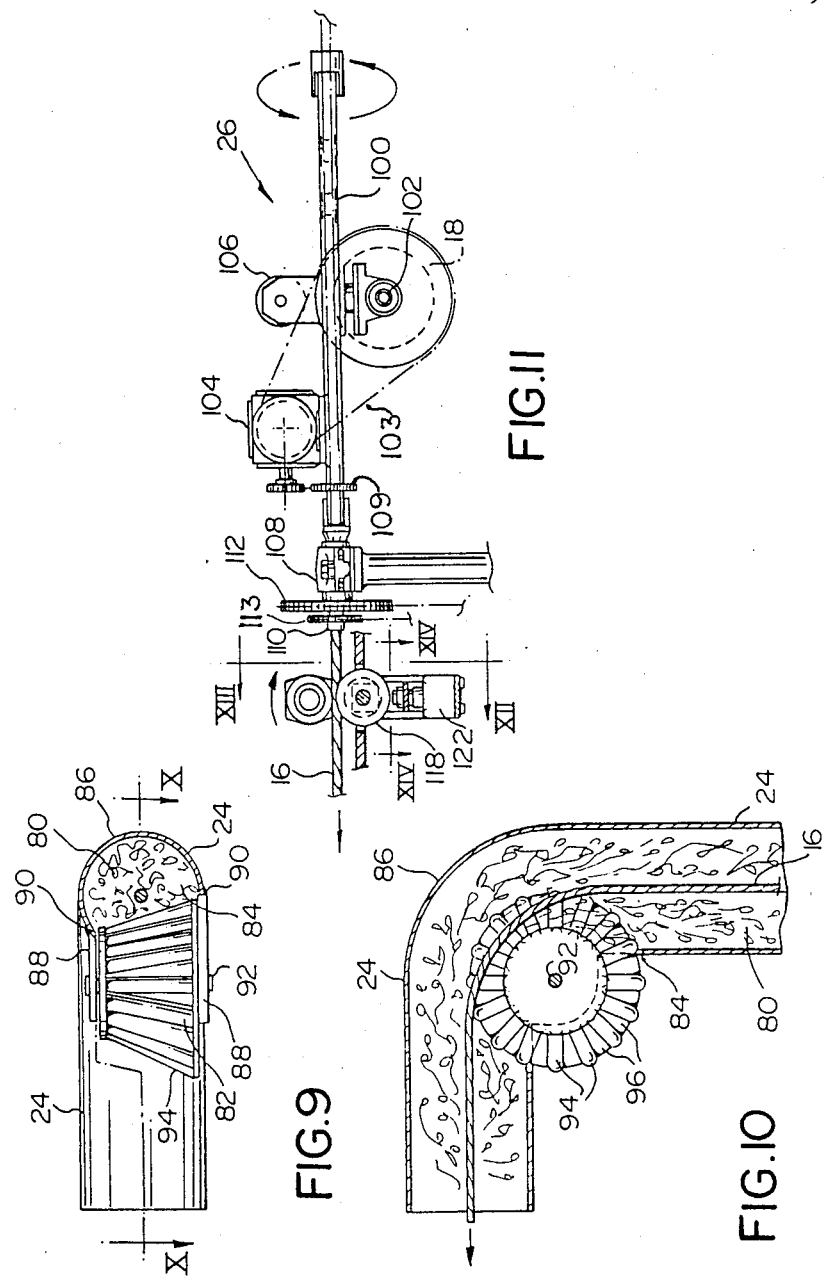

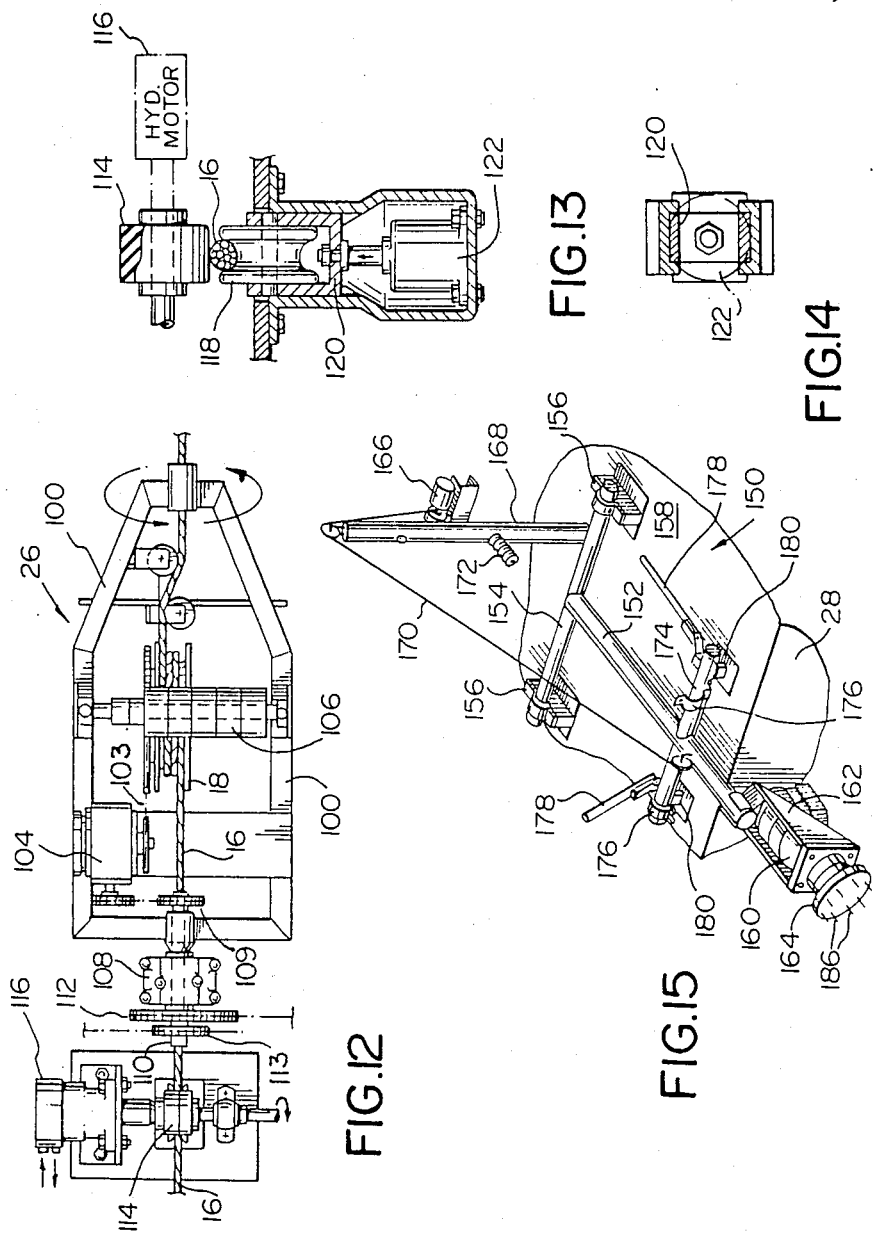

FIG.16
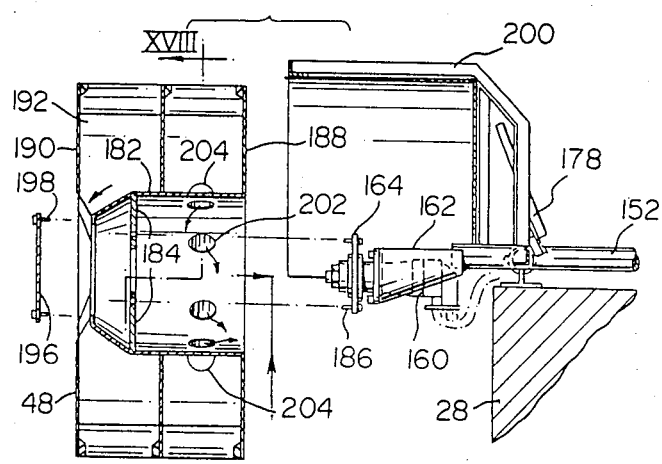
FIG.19
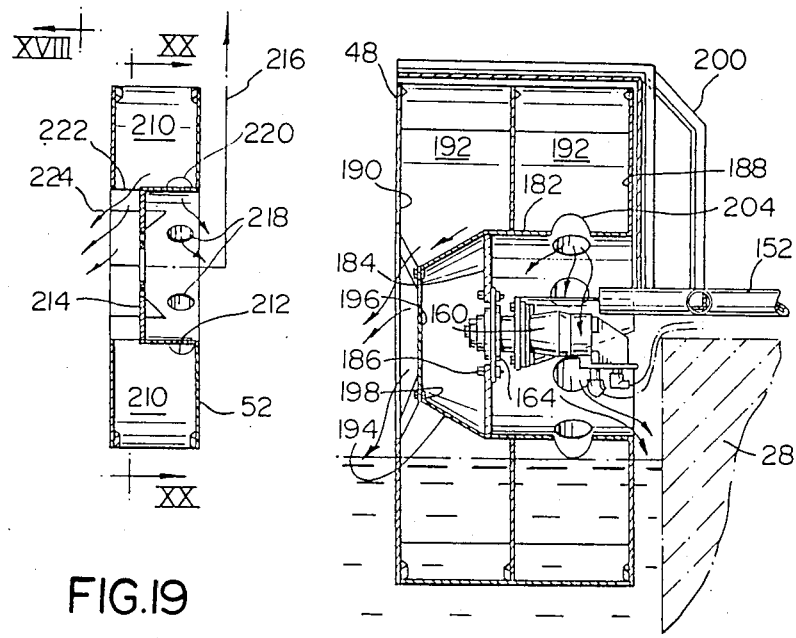
FIG.17

PLANT HARVESTER

This invention relates to a plant harvester and more particularly to apparatus for winding plant growth about a moving cable and tearing the plant growth and roots from the earth.

The apparatus is self-contained and mountable upon a platform to be carried by a vehicle for clearing undesirable weed or plant growth from fields, farms and the like and, in one preferred embodiment, the apparatus is mountable upon a particularly designed boat for harvesting aquatic plant growth from lakes, rivers, canals and the like.

BACKGROUND OF THE INVENTION

The invention is an improvement over the inventor's U.S. Pat. No. 4,328,658 which was granted on May 11, 1982. The patent discloses apparatus for rotating a cable about its longitudinal axis and moving the cable through plant growth and winding it upon the cable and, in the process, pulling the roots of the plant for precluding or minimizing regrowth.

The patent discloses the apparatus as being useful with a pair of land vehicles, or one land vehicle and a boat, or with a pair of boats. In operation, a cable is moved through plant growth, the cable is rotated about its longitudinal axis, the plants, or weeds, are wrapped about the cable which is then drawn back into the apparatus, and cutters are provided for removing the plant growth from the cable.

SUMMARY OF THE INVENTION

The present invention relates to self-contained apparatus wherein the harvester mechanism is mountable upon a platform carried by a single vehicle, such as a truck or the like, while a preferred embodiment utilizes a single watercraft, i.e., a boat, for removing aquatic plant growth from bodies of water.

An object of the invention is to provide a floating harvester comprising a buoyant hull, the hull including a plurality of independent compartments for entrapping air therein, the compartments containing openings therein for allowing entry and egress of water for entrapping air in the compartments and floating the hull upon a body of water, harvester means carried by the hull for harvesting plant growth in the body of water, and means carried on the hull for varying the amount of water and air entrapped in the compartments for adjusting the freeboard of the hull.

Another object of the invention is to provide such a floating harvester with means for varying the freeboard of the hull and simultaneously changing the operating depth of the harvester apparatus.

A further object of the invention is to provide a watercraft comprising a hull having a bow, a stern, a port side and a starboard side, a plurality of paddle wheels, means for mounting individual ones of the paddle wheels respectively at the bow, stern, port side and starboard side, and independent drive means for individually rotating each of the plurality of paddle wheels.

Another object of the invention is to provide such a watercraft wherein each of the plurality of paddle wheels includes mounting means for pivotally connecting the paddle wheels to the hull for moving the paddle wheels between a lower operating position and a raised inoperative position whereby the watercraft may be selectively moved forwardly, rearwardly, laterally and rotationally.

A still further object of the invention is to provide an improved paddle wheel for propelling a craft upon a body of water, the paddle wheel comprising a central hub, motor means mounted within the central hub, vane means extending outwardly from the hub and openings formed in the hub for directing water from the vane means across the motor means for cooling the same.

A further object of the invention is to provide such a paddle wheel with mounting means for mounting the motor means and the paddle wheel on the craft, the mounting means including pivot means for pivotally connecting the motor means and the paddle wheel to the craft and means for raising and lowering the paddle wheel about the pivot means between an operative position and a stowed position.

Another object of the invention is to provide a harvester of the type including a cable means which is rotated about its longitudinal axis for winding plant growth thereon, the improvement comprising an intake tube for receiving the cable means and plant growth carried thereby, the intake tube having a bight portion, and guide means disposed at the bight portion for guiding the cable means past the bight portion and out of contact with the intake tube.

An additional object of the invention is to provide a harvester of the type including a cable means which is rotated about its longitudinal axis for winding plant growth thereon, the improvement comprising platform means for supporting the harvester thereon, transport means for moving the platform means and the harvester over plant growth to be harvested, the cable means comprising an endless cable, a cable output guide and a cable intake guide for defining a path of movement for the endless cable, the endless cable having an operative portion thereof extending between the cable output guide and the cable intake guide, and means for adjustably positioning the operative portion of the endless cable by raising and lowering the operative portion relative to the platform.

A still further object of the invention is to provide such a harvester wherein the transport means comprises a watercraft for moving on a body of water, and the platform means comprises a deck portion of the craft, the means for adjustably positioning the operative portion of the endless cable comprises means for pivotally mounting the cable output guide and the cable intake guide relative to each other whereby the operative portion of the endless cable can be oriented horizontally and at various angles to the horizontal, the harvester including tensioning means for tensioning the operative portion of the endless cable wherein adjustable means are connected to and between the cable output guide and the cable intake guide for varying the distance therebetween.

A further object of the invention is to provide such a harvester with a tumbling means for rotating the endless cable about its longitudinal axis, a capstan mounted on the tumbler for pulling the endless cable along its length and through the cable output guide and the cable intake guide.

An additional object of the invention is to provide such a harvester with tightening means mounted adjacent to the tumbler means and in contact with the endless cable, the tightening means including a drive roller, means for rotating the drive roller for tightening the wrapped portion of the endless cable into driving contact with the capstan, the tightening means further comprising a pulley disposed in contact with the endless cable, and fluid motor means for moving the pulley toward the drive roller for forcing the endless cable into contact with the drive roller.

BRIEF DESCRIPTION OF THE DRAWINGS

FIG. 2 i an elevational view of the boat and harvesting apparatus and illustrates adjustable features of the harvesting apparatus and paddle wheels.

FIG. 3 is a plan view of a boat, with the harvester apparatus removed, and illustrates a series of compartments in the hull thereof including a manifold for supplying pressurized air to adjust the freeboard of the boat.

FIG. 4 is a sectional view, taken on line 4—4 of FIG. 3, and illustrates openings in the hull for allowing entry and egress of water to adjustably vary the freeboard of the boat.

FIG. 5 is a transverse, sectional view, taken on line 5—5 of FIG. 4, and illustrates the introduction of air into compartments of the hull for varying the water contained within the compartments.

FIG. 6 is an enlarged, fragmentary, sectional view of a central portion of FIG. 5.

FIG. 7 is an end view, looking from the right of FIG. 1, and illustrates mechanisms for positioning the harvester cable and adjusting tension of the cable.

FIG. 8 is a fragmentary perspective view of the harvester cable mechanism and illustrates the path of movement of the endless cable from an output guide tube and into a larger cable intake guide, and an adjustable framework for changing the spacing of the output guide and intake guide for adjusting tension in the cable.

FIG. 9 is an enlarged, fragmentary view, taken on line 9—9 of FIG. 8, and illustrates a sheave fixedly secured in a bight portion, or elbow, of the cable intake guide.

FIG. 10 is a sectional view, taken on line 10—10 of FIG. 9, and illustrates the harvester cable and plant growth wrapped therearound as the cable passes through the bight of the intake guide tube.

FIG. 11 is a fragmentary, elevational view, taken on line 11—11 of FIG. 1, and illustrates a tumbler mechanism for rotating the endless cable about its longitudinal axis, and also illustrates a drive capstan for pulling the cable along its longitudinal length, and a tightening or snubbing mechanism for tightening the cable about the capstan for providing a driving connection therewith.

FIG. 12 is a plan view of the apparatus of FIG. 11.

FIG. 13 is an enlarged, fragmentary section, taken on line 13—13 of FIG. 11, and illustrates an adjustable drive mechanism for pulling on the cable to tighten the same about the capstan.

FIG. 14 is a fragmentary, sectional view, taken on line 14—14 of FIG. 11.

FIG. 15 is a fragmentary, perspective view of a pivotally mounted structure for carrying an individual drive motor for one of the paddle wheels and also illustrates a winch mechanism for moving the paddle wheels from an operative to an inoperative position.

FIG. 16 is an exploded view and illustrates the manner of assembling a paddle wheel into position with its drive motor.

FIG. 17 is an enlarged sectional view and illustrates the paddle wheel being mounted in operative position.

FIG. 19 is a sectional view of another form of paddle wheel.

DETAILED DESCRIPTION OF THE INVENTION

Figure 1:
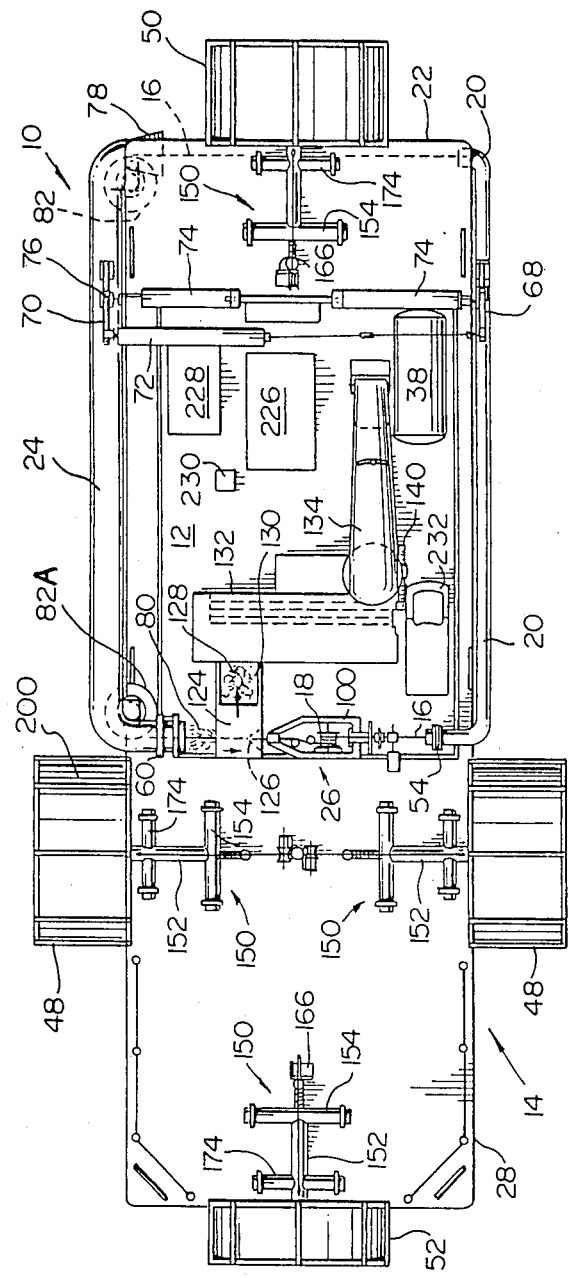
FIG. 1 is a plan view of a harvester apparatus in accordance with the present invention, the harvester apparatus being mounted upon a platform, i.e., the deck of a boat provided with a plurality of paddle wheels for providing mobility for the apparatus.
Figure 18:
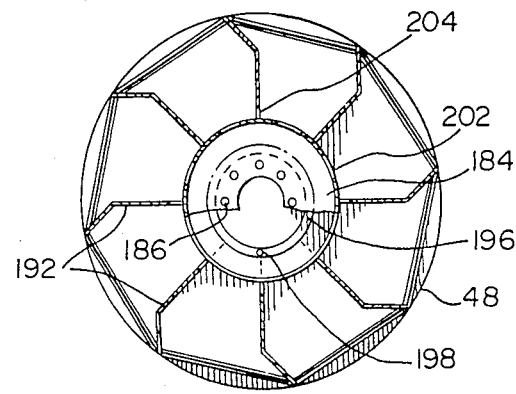
FIG. 18 is a jump-section, taken on line 18—18 of FIG. 16, and illustrates constructional details of the paddle wheel.

A plant or weed harvester assembly, generally indicated by the numeral 10, has the various components thereof mounted and arranged upon a platform 12, which platform may be mounted upon a vehicle, or farm truck (not shown), or may be mounted upon a watercraft or boat 14.

Harvester assembly 10 includes an endless cable 16 which is pulled by a capstan 18 in a generally rectangular path through an output guide tube 20, across a rear portion 22 of platform 12, through a cable intake guide tube 24 and back to capstan 18. In addition to being pulled along its longitudinal length by capstan 18, endless cable 16 is also caused to rotate about its longitudinal axis by a tumbler apparatus, generally indicated by the numeral 26, which is somewhat similar to the tumbler apparatus disclosed in U.S. Pat. No. 4,328,658. Specific details of tumbler apparatus 26 will be more particularly described later in this specification.

In one preferred form of the invention, harvester assembly 10 is useful for harvesting undesirable plant growth in shallow lakes, rivers and canals. In such an embodiment, platform 12 comprises the deck of boat 14. As is evident from FIGS. 1-6, boat 14 is comprised of a buoyant hull 28 which includes a series of hollow compartments 30, six such compartments being shown, and a plurality of baffle plates or partitions 32 are secured within and to the bottom of hull 28 and extend upwardly just short of deck or platform 12 to provide a series of air passageways 34 to distribute pressurized air throughout the series of hollow compartments 30. When boat 14 is operated in shallow water, it is not unusual to encounter submerged obstacles such as large roots, tree stumps, rocks and various types of debris. The underside of hull 28 is therefore protected by reinforced skid bars 36 and, in addition, while buoyant hull 28 is designed to have a shallow draft, boat 14 is equipped with a reservoir 38 which contains pressurized air that can be distributed through a manifold 40 and a network of air lines 42 to distribute pressurized air to each of the hollow compartments 30. A series of openings 44 are formed in each of the various compartments 30 to allow entry and exit of water in an amount determined by the pressurized air within the compartments 30. During stormy weather or rough water conditions, it is desirable to reduce the freeboard so that boat 14 rides low in the water, and this is readily accomplished by reducing the pressurized air in the hollow compartments 30 by allowing air to exit through an air valve or vent 46 included within manifold 40. As a result, water enters through the series of openings 44 in the bottom of hull 28. In very shallow water, or when the skid bars 36 encounter submerged obstacles, pressurized air from reservoir 38 is introduced through manifold 40 and air lines 42 to reduce the amount of water contained within the hollow compartments 30 and thereby increase the freeboard, to decrease the draft of boat 14 and allow the buoyant hull 28 to float high in the water. It will also be understood that this feature of adjusting the draft and freeboard of boat 14 is also useful for adjusting the underwater depth of endless cable 16 at the rear portion of platform 12 located at the stern of buoyant hull 28.

Boat 14 is made to be highly maneuverable by providing a pair of paddle wheels 48 at the port and starboard sides, a third paddle wheel 50 at the stern and a fourth paddle wheel 52 at the bow. Each paddle wheel is independently driven and may be rotated in opposite directions; as a result, boat 14 may be moved forwardly, rearwardly, laterally, or rotationally.

As is best shown in FIGS. 1 2, 7 and 8, endless cable 16 is moved lengthwise in a predetermined path. The operative portion of cable 16, i.e., that portion upon which weeds or other plant growth are wound and pulled by their roots, is that portion of endless cable 16 which extends between output guide tube 20 and cable intake guide tube 24. The operating depth and inclination of the operative portion of endless cable 16 are adjustable by raising and lowering guide tubes 20 and 24, as is best shown in FIGS. 7 and 8. Output guide tube 20 is pivotally mounted in a pivot block 54 and may be raised and lowered by a port-side winch 56 which carries a cable or line 58. Likewise, cable intake guide tube 24 is pivotally mounted in a pivot block 60 for rotation in a substantially vertical plane and is movable by a starboard winch 62 which carries a cable or line 64. The individual depth of tubes 20 and 24 can be varied to dispose cable 16 horizontally or at inclinations thereto in order to accommodate various slopes and terrain in the river, canal or lake bed.

A tensioning frame 66 includes a pair of spreader arms 68 and 70 which are pivotally connected to guide tubes 20 and 24 and have their upper ends connected by a hydraulic cylinder 72 which extends or contracts to slacken or add tension to cable 16. Telescoping support members 74, preferably square or rectangular, are carried by platform 12 and carry pivotally mounted sleeves 76 through which spreader arms 68 and 70 slide during raising and lowering of guide tubes 20 and 24 by winches 56 and 62, respectively.

Referring to FIGS. 7-10, the operative portion of endless cable 16 passes from the intake guide tube 20 and enters a funnel 78 fixed at the entrance portion of cable intake guide tube 24. As was previously noted, cable 16 is continuously rotated about its axis by tumbler apparatus 26, and weeds or other plant growth are wrapped about the cable 16 and pulled by their roots. As is best shown in FIGS. 9 and 10, a sheave 82 is rotatably mounted within an opening 84 which is formed at an elbow or bight 86 of the guide tube 24. A pair of support brackets 88 are welded, at 90, and rotatably mount sheave 82 on an axle 92. Sheave 82 includes a series of spaced ribs 94 which form a series of spaced grooves 96 therebetween. Tension in cable 16 causes the plant growth 80 wrapped therearound to be pressed into grooves 96 and provide a driving connection for rotating sheaves 82 about axle 92. As a result, cable 16 is moved through the elbow or bight 86 without causing any jamming or excessive wear on guide tube 24.

FIGS. 11-14 show a tumbler apparatus 26 which is somewhat similar to that shown in my U.S. Pat. No. 4,328,658. Capstan 18 is rotatably mounted upon a frame 100, on an axle 102 and rotatably driven by a drive chain 103 connected to a gear box 104 and is balanced by a series of counterweights 106. Frame 100 is rotatably mounted in a bearing block 108 by a sleeve which is rotatably driven by a gear and chain 112 (connected to a drive motor, not shown) for rotating frame 100 and a gear and chain 113 (connected to a drive motor, not shown) for rotating a sleeve 110, drive member 109, gear box 104 and capstan 18 for imparting rotation to endless cable 16 about its axis. A similar drive mechanism is shown in my earlier U.S. Pat. No. 4,328,658.

Cable 16 has several loops thereof wrapped about capstan 18, as is best shown in FIG. 12, and must be kept snug therewith to maintain a pulling action. As is best shown in FIGS. 13 and 14, a friction drive roller 114 is rotatably driven by a hydraulic motor 116 and provides a pulling action for tightening the wrapped portion of endless cable 16 into driving contact with capstan 18. Cable 16 is maintained in driving relationship with drive roller 114 by a pulley 118 which is rotatably mounted upon a sliding frame 120 carried by a fluid motor 122 for moving frame 120 and pulley 118 to force cable 16 into driving contact with drive roller 114.

As can be seen in FIG. 1, cable 16 and plant growth 80 exits from guide tube 24 around a second sheave 82A and enters a cutter mechanism 124 which includes a rotating blade 126 for stripping plant growth 80 from the cable 16. Chopped plant growth 128 moves through a chute 130 into a conventional harvester machine 132 and out through a harvester chute 134. As is best shown in FIGS. 1 and 2, harvester chute 134 may be pivotally mounted, at 136, to reduce its overall height during nonuse and can be rotated to an outboard position by a motor 138 and rack 140 so that chopped plant growth 128, which has been stripped from cable 16 by cutter blade 126, can be loaded into an accompanying barge (not shown) maintained alongside and periodically driven to the shore and emptied.

The port and starboard paddle wheels 48, the stern paddle wheel 50 and the bow paddle wheel 52 are each pivotally mounted so as to be movable from their operating position, as is shown in FIG. 1, to a stowed position when not being used to propel the boat 14 or when the boat is being moved over land, such as being transported on a truck. As is best shown in FIGS. 15-17, a T-shaped mounting means, generally indicated by the numeral 150, includes a leg 152 secured to a stem 154 which is pivotally mounted in spaced bearing blocks 156 secured to the platform or deck 158 of the buoyant hull 28. A hydraulic drive motor 160 is fixedly secured to an end of leg 152 by a rigid mounting bracket 162 and rotates a drive plate 164. As is best shown in FIG. 15, a motor driven winch 166 is mounted upon a gin pole 168 and includes a cable or line 170 which is attached to leg 152. Thus, winch 166 can raise or lower hydraulic motor 160 by rotating the stem 154, of mounting means 150, in the bearing blocks 156. A shock absorber spring 172 is secured to gin pole 168 for engaging leg 152 when it is in the raised position. Mounting means 150 also includes a locking beam 174 which is welded or otherwise securely fastened to leg 152 and is locked to deck 158 by a pair of locking straps 176 and levers 178 which are pivotally fastened to a pair of spaced holddown blocks 180.

Details of the various paddle wheels and mounting thereof are shown in FIGS. 16-20. In FIG. 16, hydraulic drive motor 160 is shown locked in its operative position extending outboard of the hull 28. Paddle wheel 48 includes a hub 182 and a mounting plate 184 which is assembled with and secured to the drive plate of motor 160 by a plurality of bolts 186. Paddle wheel 48 includes a circular inboard end member 188 and an outboard end member 190 and a plurality of paddles or vanes 192 which are fixedly secured to the end members and to the central hub 182. A comparison of FIGS. 16 and 17 will show that paddle wheel 48 is moved axially to locate hydraulic drive motor 160 within the hub 182 so that mounting plate 184 can be secured to drive plate 164 with the bolts 186. Central hub 182 terminates at a frustoconical end portion 194 which is closed by a circular end closure plate 196 attached thereto by bolts 198. It is preferable that a canopy or cover 200 be used to enclose the various paddle wheels for safety purposes.

It will be understood that when the vanes 192 are rotated there is a tendency to pick up water and carry it upwardly with the vanes. This is particularly true when the boat 14 is riding low in the water because of flooding of the hollow compartments 30. As is best shown in FIGS. 16 and 17, the hub 182 is provided with a plurality of radial openings 202 which allow any water carried upwardly by the vanes 192 to cascade across hydraulic motor 160 to provide a cooling action thereto. Vanes 192 are also provided with crescent shaped openings 204 in order to preclude water from being carried upwardly over the top and dumped in front of the paddle wheel 48. Thus, the radial openings 202 and crescent shaped openings 204 not only allow water to be vented but make use of such water to cool the motor 16. Water which is carried upwardly by the outboard vanes 192 cascades downwardly along the frustoconical end portion 194 of hub 182 and exits at the outboard end of paddle wheel 48.

Figure 20:
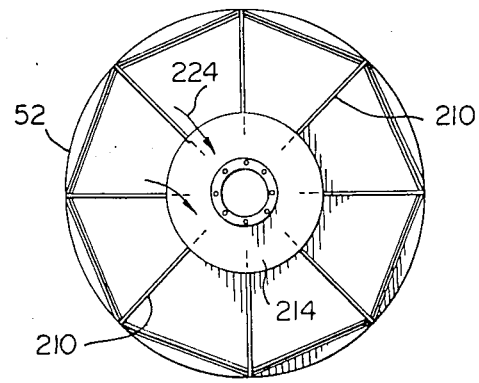
FIG. 20 is a sectional view, taken on line 20—20 of FIG. 19, and illustrates details of construction for the second form of paddle wheel.

Paddle wheel 52, at the bow of boat 14, is smaller than the side paddle wheels 48 or stern paddle wheel 50. As is shown in FIGS. 19 and 20, paddle wheel 52 includes a plurality of paddles or vanes 210 which are welded or otherwise fixedly secured to a central hub. Hub 212 is provided with a central mounting plate 214 so that paddle wheel 52 may be axially secured to motor 160 (as is indicated by the directional arrow 216 connecting FIG. 19 to FIG. 16). Hub 212 is provided with a series of radial openings 218, and vanes 210 are provided with crescent shaped openings 220 for allowing water to cascade therethrough for cooling the drive motor 160. Water can also escape through openings 222 (along arrows 224) which are formed in hub 212 outwardly of mounting plate 214.

Finally, as will h=seen in FIG. 1, all of the power requirements for operating the various equipment can be supplied by an engine 226, a fuel tank 228, and a hydraulic pump 230. All of the various necessary controls can be located adjacent to an operator's chair 232.

From the foregoing, it will be seen that there has been disclosed a preferred embodiment of a weed or plant harvester which provides advantages not heretofore found in the prior art; the spirit and scope of the invention is, however, not to be restricted by the detailed description of the preferred embodiment but only by the spirit and scope of the invention as defined in the appended claimed subject matter.

I claim:

1. A harvester of the type including a cable means which is rotated about its longitudinal axis for winding plant growth thereon, the improvement comprising an intake tube for receiving said cable means and plant growth carried thereby, said intake tube having a bight portion, and guide means disposed at said bight portion for guiding said cable means past said bight portion and out of contact with said intake tube.

2. A harvester as defined in claim 1 including an open formed in said intake tube at said bight portion, said guide means comprising a sheave, and means for rotatably mounting at least a portion of said sheave within said intake tube at said opening.

3. A harvester as defined in claim 2 wherein said sheave includes rib means on a surface thereof for receiving plant growth carried by said cable means for rotating said sheave within said opening.

4. A harvester of the type including a cable means which is rotated about its longitudinal axis for winding plant growth thereon, the improvement comprising:
   a. a unitary platform means for supporting said harvester thereon;
   b. transport means for moving said platform means and said harvester over plant growth to be harvested;
   c. said cable means comprising an endless cable;
   d. a cable output guide and a cable intake guide for defining a path of movement for said endless cable;
   e. said endless cable having an operative portion thereof extending between said cable output guide and said cable intake guide; and
   f. means for adjustably positioning said operative portion of said endless cable by raising and lowering said operative portion relative to said platform.

5. A harvester as defined in claim 4 wherein said transport means comprises a watercraft for moving on a body of water and said platform means comprises a deck portion of said craft.

6. A harvester as defined in claim 4 including tensioning means for tensioning said operative portion of said endless cable.

7. A harvester as defined in claim 6 wherein said tensioning means comprises adjustable means connected to and between said cable output guide and said cable intake guide for varying the distance therebetween.

8. A harvester as defined in claim 4 including a tumbler means for rotating said endless cable about its longitudinal axis, a capstan mounted on said tumbler for pulling said endless cable along its length and through said cable output guide and said cable intake guide.

9. A harvester as defined in claim 8 wherein said en cable includes a portion thereof wrapped around said capstan, the improvement further comprising tightening means mounted adjacent to said tumbler means and in contact with said endless cable, said tightening means including a drive roller, and means for rotating said drive roller for tightening the wrapped portion of said endless cable into driving contact with said capstan.

10. A harvester as defined in claim 9 wherein said tightening means further comprises a pulley disposed in contact with said endless cable, and fluid motor means for moving said pulley toward said drive roller for forcing said endless cable into contact with said drive roller.

11. A harvester of the type including a cable means which is rotated about its longitudinal axis for winding plant growth thereon, the improvement comprising:
   a. platform means for supporting said harvester thereon;

b. transport means for moving said platform means and said harvester over plant growth to be harvested;
c. said cable means comprising an endless cable;
d. a cable output guide and a cable intake guide for defining a path of movement for said endless cable;
e. said endless cable having an operative portion thereof extending between said cable output guide and said cable intake guide; and
f. means for adjustably positioning said operatives portion of said endless cable by raising and lowering said operative portion relative to said platform, said means for adjustably positioning said operative portion of said endless cable comprising means for pivotally mounting said cable output guide and said cable intake guide relative to each other whereby said operative portion of said endless cable can be oriented horizontally and at various angles to the horizontal.

* * * * *